United States Patent
Crescenzo et al.

(10) Patent No.: US 9,193,448 B2
(45) Date of Patent: Nov. 24, 2015

(54) AIRCRAFT WHEEL FITTED WITH DRIVEKEY-BOLTS

(71) Applicant: MESSIER-BUGATTI-DOWTY, Velizy Villacoublay (FR)

(72) Inventors: Marie-Laure De Crescenzo, Velizy-Villacoublay (FR); Christophe Verdurmen, Velizy-Villacoublay (FR); Jacques Bussiere, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 166 days.

(21) Appl. No.: 14/132,630

(22) Filed: Dec. 18, 2013

(65) Prior Publication Data

US 2014/0175860 A1 Jun. 26, 2014

(30) Foreign Application Priority Data

Dec. 20, 2012 (FR) ..................... 12 62407

(51) Int. Cl.
| | | |
|---|---|---|
| B64C 25/36 | (2006.01) | |
| B60B 25/00 | (2006.01) | F16D 55/24 |
| (2006.01) | | B64C 25/44 |
| (2006.01) | | F16D 65/02 |
| (2006.01) | | |

(52) U.S. Cl.
CPC .................. *B64C 25/36* (2013.01); *B60B 25/00* (2013.01); *B64C 25/44* (2013.01); *F16D 55/24* (2013.01); *F16D 2065/1392* (2013.01)

(58) Field of Classification Search
CPC ........ B64C 25/32; B64C 25/36; B64C 25/34; B64C 25/405; B64C 25/42; B64C 25/426; B64C 25/26; B60B 19/00; F16D 55/36; F16D 65/005; F16D 65/02; F16D 65/123; F16D 2065/1376; F16D 2065/138; F16D 2065/1392

USPC ............... 301/6.1, 6.2, 6.91, 64.303, 64.305; 188/71.5, 218 R; 244/103 R, 110 A, 244/104 R, 104 CS, 104 FP, 104 LS, 111, 244/110 H, 100 R

See application file for complete search history.

(56) References Cited

U.S. PATENT DOCUMENTS

| 3,871,709 | A | * | 3/1975 | Eaton ................. 301/64.304 |
| 4,585,096 | A | | 4/1986 | Bok |
| 4,856,619 | A | * | 8/1989 | Petersen ................. 188/18 A |
| 4,944,370 | A | | 7/1990 | Chambers et al. |
| 5,402,865 | A | * | 4/1995 | Harker ................. 188/71.5 |
| 7,488,044 | B2 | * | 2/2009 | Scelsi et al. ............. 301/6.2 |
| 8,668,276 | B2 | * | 3/2014 | Hall et al. .............. 301/6.2 |

FOREIGN PATENT DOCUMENTS

FR     2 616 712 A1    12/1988

OTHER PUBLICATIONS

French Preliminary International Search Report and Written Opinion of FR 12 62407 dated Aug. 6, 2013.

* cited by examiner

*Primary Examiner* — S. Joseph Morano
*Assistant Examiner* — Jean Charleston
(74) *Attorney, Agent, or Firm* — Sughrue Mion, PLLC

(57) ABSTRACT

An aircraft wheel comprising two half-wheels (1, 2) assembled together by means of bolt fasteners (10; 110) clamping together disks of the half-wheels, each bolt fastener comprising a bolt (11; 111) with an end forming a screw head (12; 112) and a threaded end (13; 113) for receiving a nut (14; 114), the wheel also being fitted with drive keys (20; 120) that are fitted to one of the half-wheels for driving brake disks in rotation, the wheel being characterized in that each drive key has a first end (23; 123) that is shaped to co-operate with the screw head of one of the bolts so that said first end is held and prevented from moving when the key is in place on the wheel.

6 Claims, 2 Drawing Sheets

AIRCRAFT WHEEL FITTED WITH DRIVEKEY-BOLTS

The invention relates to an aircraft wheel fitted with drivekey-bolts.

BACKGROUND OF THE INVENTION

Aircraft wheels are known that comprise two half-wheels assembled together by means of bolts that are regularly distributed in order to clamp together the disks of the half-wheels. Typically, such an assembly may require a dozen bolts. For this purpose, the disks of the half-wheels are pierced with facing orifices suitable for receiving the bolts. Furthermore, one of the half-wheels receives drive keys on the inside face of its rim in order to drive in rotation rotor disks of a disk brake, which disks are located in operation inside said half-wheel. Depending on circumstances, the drive keys are formed integrally with the half-wheel, or else they are fitted thereto. When they are fitted thereto, the disk of the half-wheel includes holes for receiving finger-shaped ends of the drive keys, with fastener means also being provided at the other ends of the drive keys in order to fasten them to the rim of the half-wheel.

OBJECT OF THE INVENTION

An object of the invention is to provide a simplified aircraft wheel.

SUMMARY OF THE INVENTION

In order to achieve this object, the invention provides an aircraft wheel comprising two half-wheels assembled together by means of bolt fasteners clamping together disks of the half-wheels, each bolt fastener comprising a bolt with an end forming a screw head and a threaded end for receiving a nut, the wheel also being fitted with drive keys that are fitted to one of the half-wheels for driving brake disks in rotation. According to the invention, each drive key has a first end that is shaped to co-operate with the screw head of one of the bolt fasteners so that said first end is held and prevented from moving when the key is in place on the wheel.

There is thus no need to provide bosses or holes in the disks in order to receive specifically the first ends of the drive keys. As a result the wheel is simplified.

BRIEF DESCRIPTION OF THE DRAWINGS

The invention can be better understood in the light of the following description of a particular embodiment of the invention given with reference to the accompanying figures, in which.

DETAILED DESCRIPTION OF THE INVENTION

Figure 1:
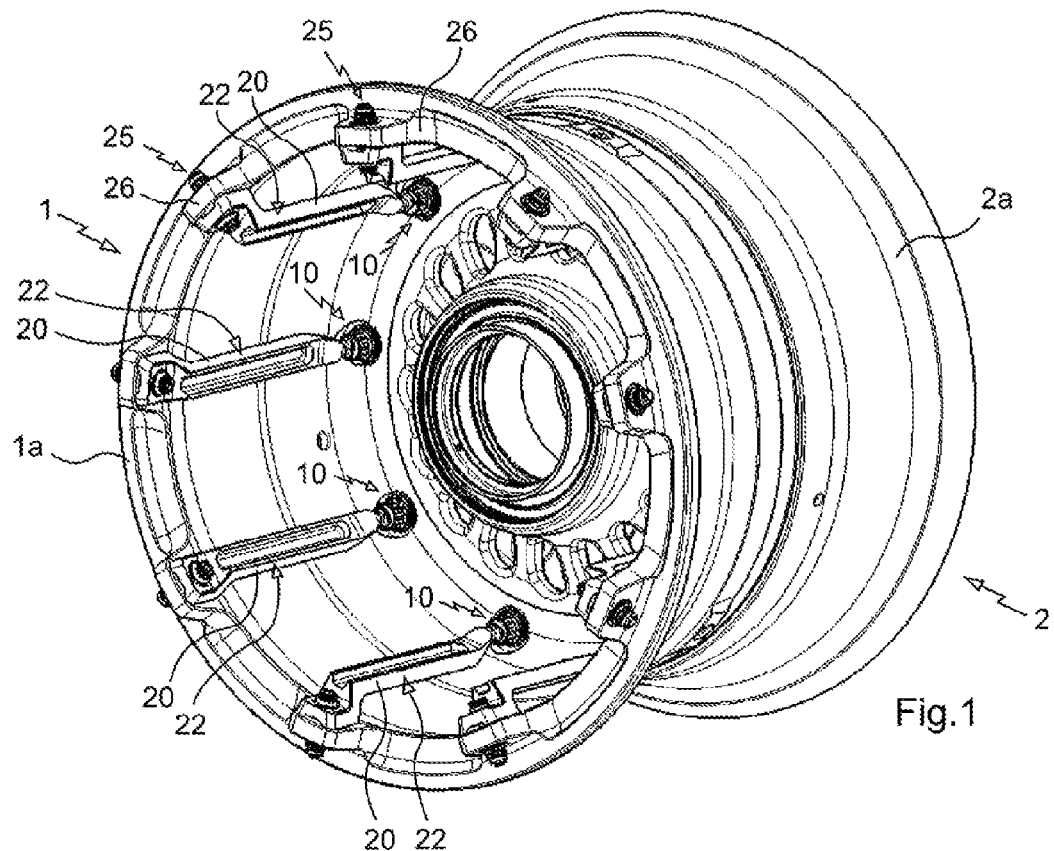
FIG. 1 is a perspective view of an aircraft wheel in a particular embodiment of the invention.
Figure 2:
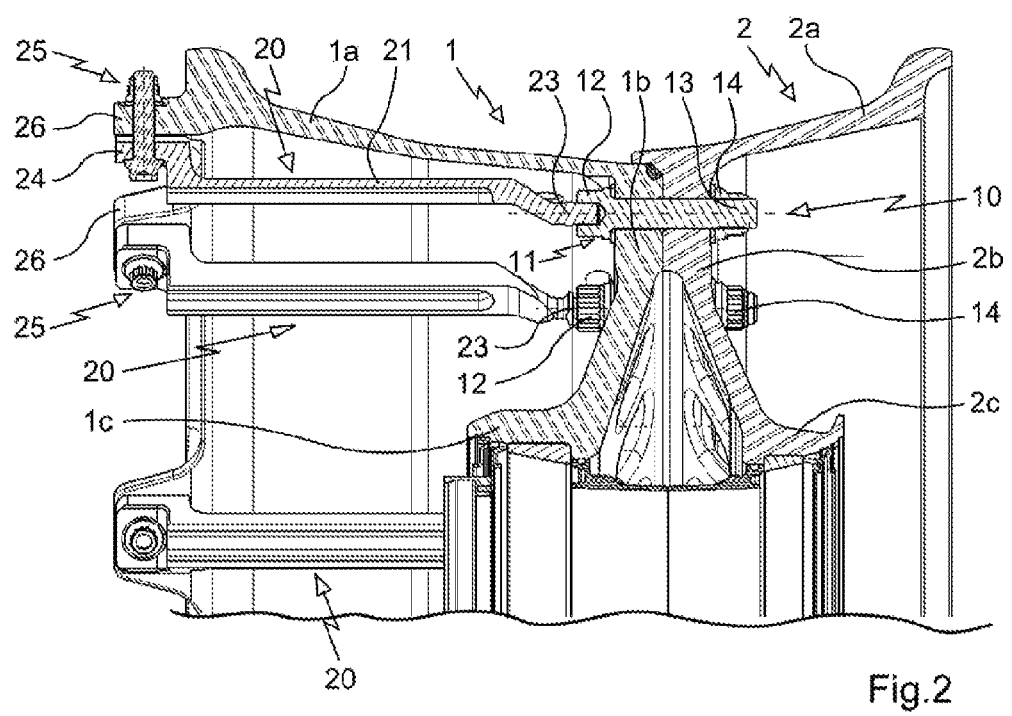
FIG. 2 is a fragmentary section view containing the axis of rotation of the FIG. 1 wheel, and intersecting one of its bolts.

The wheel shown in FIGS. 1 and 2 comprises in known manner two half-wheels 1, 2, each having a rim portion 1a, 2a, a disk portion 1b, 2b, and a half-hub 1c, 2c. In known manner, the half-wheels are brought together along a direction parallel to the axis of rotation of the wheel and they have centering bearing surfaces to ensure that the half-wheels are properly positioned relative to each other.

The half-wheels are held in position by bolt fasteners 10 comprising a bolt 11 with a head 12 and a threaded end 13 for receiving a nut 14.

The wheel also has drive keys 20 fitted thereto, each comprising a main portion 21 having two flanks 22 for co-operating with brake disk staples. Each drive key 20 has a first end 23, of cylindrical shape in this example, that is shaped to be received in a central orifice in the head 12 of the facing bolt 11, and a second end 24 that is pierced, in this example, to receive a bolt fastener 25 for fastening said end to an extension 26 that projects axially from the facing half-wheel.

In the embodiment shown, the bolt fasteners 10 are screwed and tightened so as to assemble the two half-wheels together, and then the drive keys 20 are fitted on the screw heads of the bolts and their second ends are fastened to the wheel.

In this example, each bolt receives one drive key. Nevertheless, that is not essential. It is possible to devise wheels having more bolts than drive keys.

Figure 3:
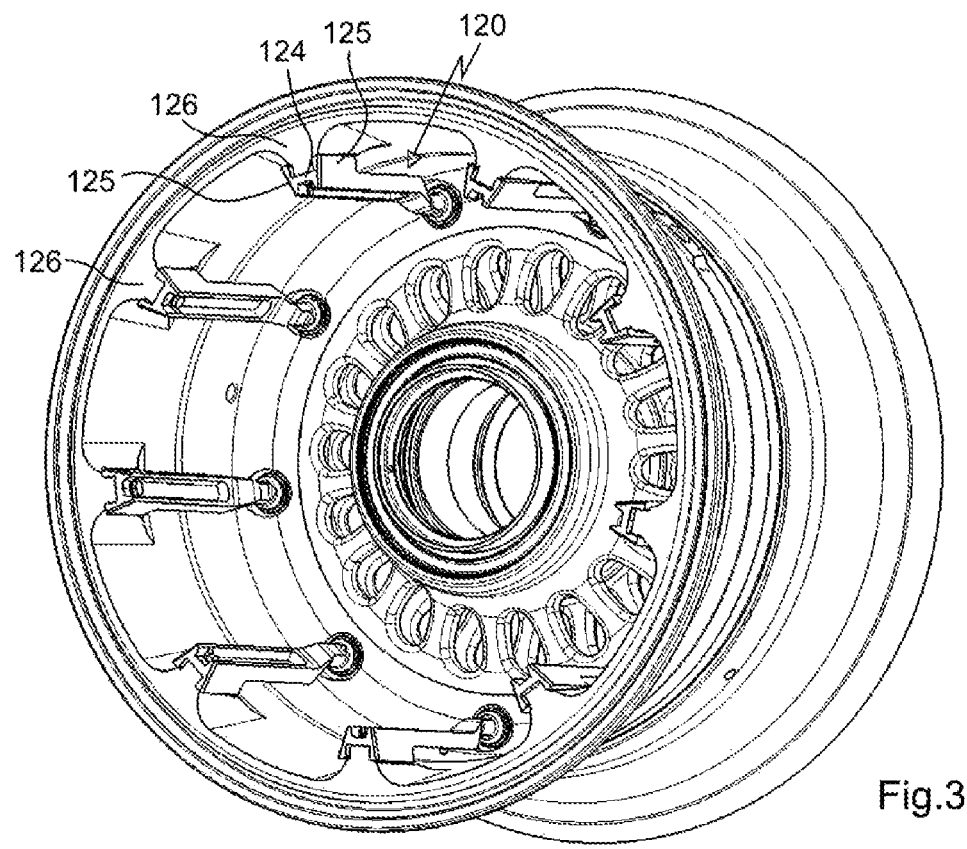
FIG. 3 is a perspective view of an aircraft wheel in a second particular embodiment.
Figure 4:
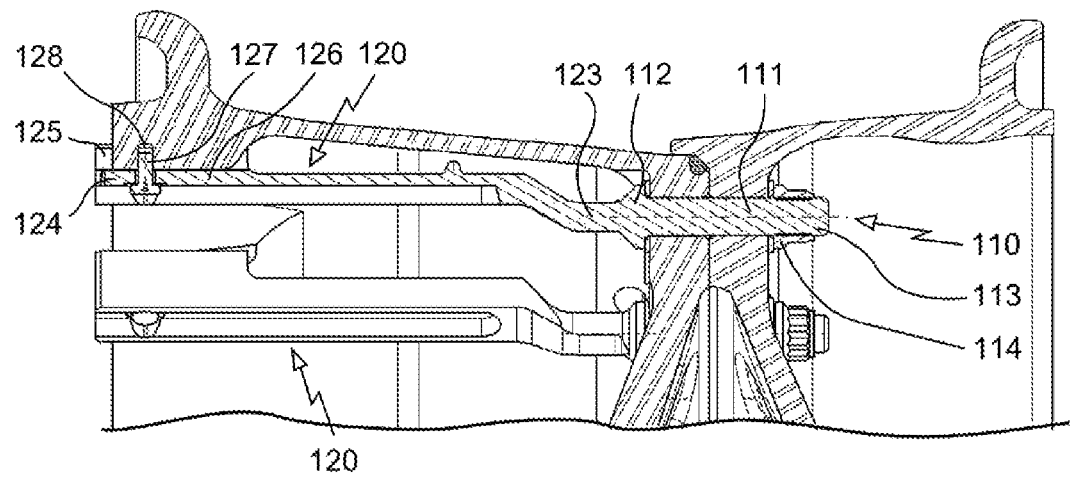
FIG. 4 is a fragmentary section view containing the axis of rotation of the FIG. 3 wheel, and intersecting one of its bolts.

In the embodiment shown in FIGS. 3 and 4, where elements that are common with elements of the above-described embodiment are given the same references plus one hundred, the end 123 of the drive key 120 is now formed integrally with the head 112 of the bolt 111, such that the drive key 120 and the bolt 111 form a one-piece unit.

It should be observed that the second end 124 presents two projections 125 that extend towards the rim so as to fit astride a boss 126 projecting radially from the rim. A bolt 127 serves to hold the second end 124 against the rim by being screwed into tapping 128 in the boss 126.

The invention is not limited to the above description, but on the contrary covers any variant coming within the ambit defined by the claims.

In particular, although in the example shown, the end of the drive key is engaged in an orifice of the screw head of the bolt, it is naturally possible to envisage an inverse configuration in which the screw head of the bolt penetrates into an end orifice in the drive key, and more generally to provide complementary shapes for the screw head and for the end of the drive key so that the key can be held stationary to the screw head of the bolt.

Although the keys and the bolts are shown herein as being two separate elements, which makes it easier to tighten the bolt fasteners, it is also possible to provide for the bolts and the keys to be made integrally. Under such circumstances, the end of the key is held permanently relative to the screw head of the bolt.

Although in the example shown, each half-wheel has a half-hub, it is naturally also possible to envisage any other subdivision, providing the two half-wheels are assembled together by means of bolt fasteners capable of receiving the ends of the drive keys and holding them in place.

The invention claimed is:

1. An aircraft wheel comprising two half-wheels (1, 2) assembled together by means of bolt fasteners (10; 110) clamping together disks of the half-wheels, each bolt fastener comprising a bolt (11; 111) with an end forming a screw head (12; 112) and a threaded end (13; 113) for receiving a nut (14; 114), the wheel also being fitted with drive keys (20; 120) that are fitted to one of the half-wheels for driving brake disks in rotation, the wheel being characterized in that each drive key has a first end (23; 123) that is shaped to co-operate with the screw head of one of the bolts so that said first end is held and prevented from moving when the key is in place on the wheel.

2. A wheel according to claim 1, wherein the first end (23) is cylindrical in shape and penetrates into a central orifice formed in the screw head (12) of the bolt.

3. A wheel according to claim 1, wherein the key has a second end (24) that is pierced to receive a bolt (25) for fastening said end to an extension (26) projecting axially from the half-wheel.

4. A wheel according to claim 1, wherein the bolts (111) of the fastener bolts and the drive keys (120) are made integrally.

5. A wheel according to claim 4, wherein the first end of the drive key is formed integrally with the screw head of the bolt.

6. A wheel according to claim 4, wherein each key has a second end carrying two projections (125) adapted to be fitted astride a facing boss on the rim of the half-wheel.

* * * * *